(12) United States Patent
Fernicola

(10) Patent No.: US 8,868,046 B2
(45) Date of Patent: Oct. 21, 2014

(54) SYSTEMS AND METHODS FOR SELECTIVE FILTERING OF INBOUND MOBILE COMMUNICATIONS

(71) Applicant: Regina M. Fernicola, Fortson, GA (US)

(72) Inventor: Regina M. Fernicola, Fortson, GA (US)

( * ) Notice: Subject to any disclaimer, the term of this patent is extended or adjusted under 35 U.S.C. 154(b) by 0 days.

(21) Appl. No.: 14/147,307

(22) Filed: Jan. 3, 2014

(65) Prior Publication Data
US 2014/0192684 A1    Jul. 10, 2014

Related U.S. Application Data

(60) Provisional application No. 61/749,075, filed on Jan. 4, 2013.

(51) Int. Cl.
*H04M 11/10* (2006.01)
*H04W 4/06* (2009.01)

(52) U.S. Cl.
CPC ........................... *H04W 4/06* (2013.01)
USPC ........................................................ 455/413

(58) Field of Classification Search
USPC ......... 455/466, 566–567, 415–416, 419–420, 455/412.2–413; 379/201.12, 211.01
See application file for complete search history.

(56) References Cited

U.S. PATENT DOCUMENTS

| 2007/0293207 A1* | 12/2007 | Guedalia et al. | 455/415 |
| 2009/0325615 A1* | 12/2009 | McKay et al. | 455/466 |
| 2011/0286591 A1* | 11/2011 | Fulton et al. | 379/201.12 |

* cited by examiner

*Primary Examiner* — Thai Hoang
(74) *Attorney, Agent, or Firm* — Ryan A. Schneider; Jay R. Anderson

(57) ABSTRACT

Various implementations of the disclosed technology relate to selectively filtering inbound communications. An example implementation may send filtered incoming calls directly to an alternate voicemail account based on a list of pre-approved contacts. Moreover, a user notification may not be provided at the time of receiving the incoming call. In another implementation, a response message indicating a user status may automatically be sent back to the sender of the inbound communication. In some implementations, selective filtering of inbound communications may be activated manually by a user, or automatically at a scheduled time, or responsive to a mobile device entering a threshold distance of a location. Discrete logs may be kept for each of selective filtered and allowed inbound communications.

16 Claims, 12 Drawing Sheets

400

500

700

900

1000

SYSTEMS AND METHODS FOR SELECTIVE FILTERING OF INBOUND MOBILE COMMUNICATIONS

CROSS-REFERENCE TO RELATED APPLICATIONS

This application claims priority and the benefit under 35 U.S.C. §119(e) of U.S. Provisional Patent Application No. 61/749,075, filed 4 Jan. 2013, of which the entire contents and substance are hereby incorporated by reference as if fully set forth below.

BACKGROUND

The proliferation of mobile computing devices (e.g., smartphones and tablets) has ushered in a new age of communication, where even users on the go can stay in touch with work contacts, family, friends, etc. However, situations may occur when the operator or user of a mobile device does not wish to receive calls or other inbound communications. Moreover, in many of these situations, the user of the mobile device may still wish to maintain the ability to send outbound communications, surf the Web, or make use of other mobile computing device functionalities that require connectivity.

Software applications, (e.g., "apps" on a smartphone) have been developed that can block incoming communications (e.g., voice calls and text messages) to a mobile computing device. However, these conventional software applications are limited in that they do not permit selective blocking based on the characteristics of the incoming mobile communication. For example, conventional smartphone apps do not permit a user to automatically block unwanted calls from a particular source or contact. Thus, a user must block all inbound communications, including desired inbound communications, in order to block some unwanted communications.

SUMMARY

Some or all of the above needs may be addressed by certain implementations of the disclosed technology. Certain implementations may include systems and methods for selective filtering of inbound communications.

According to an example implementation, a method is provided. The method may include creating a whitelist of approved contacts at a mobile computing device and activating an operating mode of the mobile computing device for filtering inbound communications based on the whitelist. The method also includes receiving a first inbound communication at the mobile device, determining that an identifier associated with the first inbound communication does not correspond to an identifier associated with any of the one or more contacts in the contact whitelist, and filtering the first inbound communication based on determining that the identifier associated with the first inbound communication does not correspond to a contact in the whitelist. The method may further include receiving a second inbound communication, determining that an identifier associated with the second inbound communication corresponds to an identifier associated with at least one of the one or more contacts in the contact whitelist, and allowing the second inbound communication responsive to the determining that the identifier associated with the first inbound communication corresponds to one of the contacts in the whitelist.

According to another example implementation, a computer readable medium is provided. The computer readable medium may store instructions that, when executed by at least one processor in a system, cause the processor to perform a method substantially similar to the method described hereinabove.

According to yet another example implementation, a system is provided. The system may include a memory operatively coupled to a processor and configured for storing data and instructions that may be executed by the processor. When executed, the system may be caused to perform a method substantially similar to the method described hereinabove.

Other implementations, features, and aspects of the disclosed technology are described in detail herein and are considered a part of the claimed disclosed technology. Other implementations, features, and aspects may be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
FIG. 1 depicts an illustration of a computing device 100, according to an example implementation.

Various implementations of the disclosed technology relate to selectively filtering inbound communications. An example implementation may send filtered incoming calls directly to an alternate voicemail account based on a list of pre-approved contacts. Moreover, a user notification may be suppressed or omitted at the time of receiving the incoming call. In another implementation, a response message indicating a user or device status may automatically be sent back to the sender of the inbound communication. In some implementations, selective filtering of inbound communications may be activated manually by a user, or automatically at a scheduled time, or responsive to a mobile device entering a threshold distance of a location. Discrete logs may be kept for each of selective filtered and allowed inbound communications.

To facilitate an understanding of the principles and features of implementations of the disclosed technology, various example implementations are explained below. Although some example implementations of the disclosed technology are explained in detail, other implementations are contemplated. Further, in describing the example implementations, specific terminology will be resorted to for the sake of clarity. It is not intended that the disclosed technology be limited in scope to the details of construction and arrangement of components set forth in the following description or illustrated in the drawings. Rather, the disclosed technology is capable of other implementations and of being practiced or carried out in various ways.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Referring now to the figures, in which like reference numerals represent like parts throughout the views, various implementations of the disclosed technology will be described in detail.

FIG. 1 depicts an illustration of a computing device 100, according to an example implementation. As shown in FIG. 1, the computing device 100 may be a mobile computing device, for example, a smartphone or a tablet. The computing device may have a built-in or integrated display 150 for displaying an application user interface. The display 150 of the mobile device may be a touch-sensitive or presence-sensitive display for receiving user input from a stylus, fingertip, or other means of gesture input. In some implementations of the disclosed technology, the computing device may be a non-mobile computing device, for example, a personal computer, with an internal or external first display operatively coupled.

Implementations of the disclosed technology may selectively filter unwanted incoming communications while still allowing incoming communications from certain contacts, and while preserving outgoing communications functionality. In an example scenario, a parent with a child at college may not want to restrict ways the child can contact the parent, but may have hundreds of other contacts, both business and personal, whom the parent does not want contact from at certain times. In another scenario, a parent with a young child may wish to attend the movies, and only permit disruptions by a babysitter or from a home phone or emergency number.

FIGS. 2-10 depict example application user interfaces for providing selective filtering of inbound mobile communications. One or more features of the disclosed technology may be implemented at least partially by software or hardware applications. Although various implementations are described herein in the context of inbound phone (e.g. voice calls, video calls, etc.) and text (e.g. SMS, MMS, etc.) mobile communications, it will be understood that the principles disclosed herein may be applicable to other forms of inbound and outbound communications to and from mobile and non-mobile computing devices.

According to various implementations, selective filtering of incoming communications may comprise processing or routing incoming communications based on characteristics of the incoming communications. For example, in one implementation, calls from a certain source (e.g., a contact) may be blocked, while calls from another pre-approved source may be allowed or given priority at the computing device 100.

Figure 2:
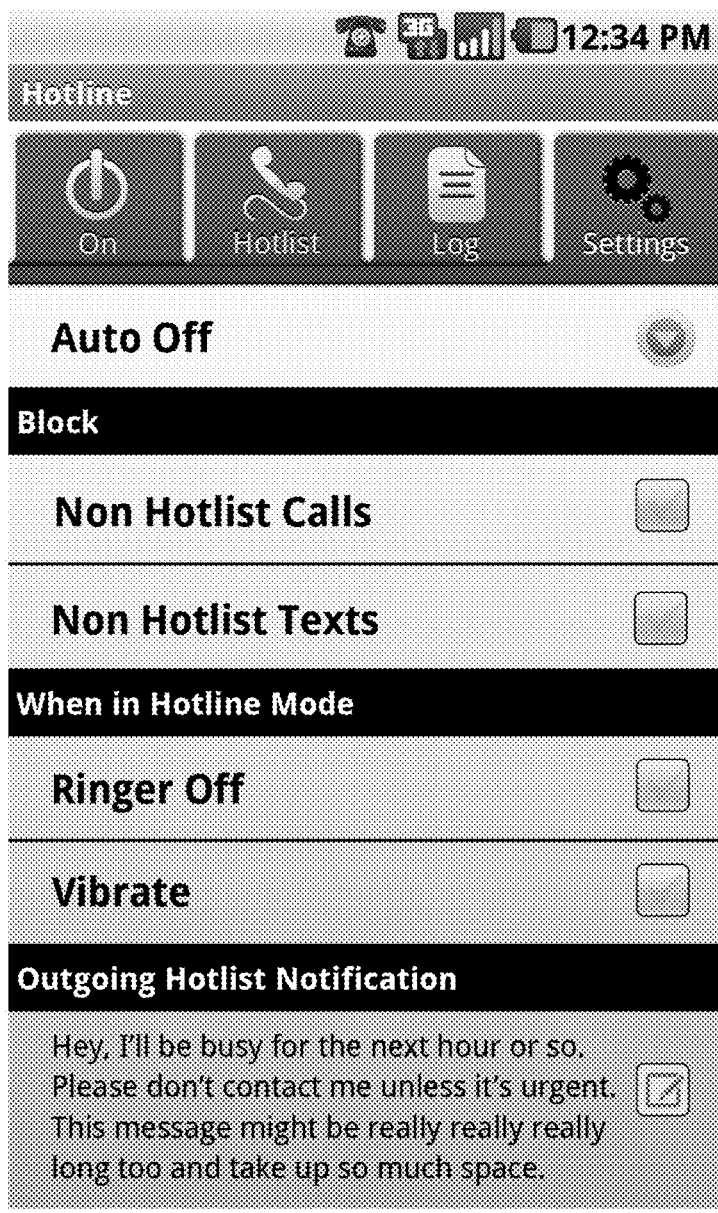
FIG. 2 depicts an illustration of various selective filtering options 200, according to an example implementation.

FIG. 2 depicts an illustration of various selective filtering options 200, according to an example implementation. In some implementations, phone calls to a computing device 100 from non-approved (or unknown) sources may not result in the usual user notification for receipt of that type of communication. For example, as shown in FIG. 2, a filtered phone call from a non-approved contact may not cause the receiving smartphone to ring or vibrate. In some implementations, user notification settings may be automatically changed upon activating selective filtering to prevent triggering of user notifications. In another implementation, triggered user notifications may be suppressed.

According to another example implementation, calls from a non-approved source may be sent directly to a voicemail account associated with the computing device, or a user of the computing device, without providing a notification of, or an opportunity to answer the call. In another implementation, calls from an approved contact may also be directed to a voicemail account, in some cases, an alternate or different voicemail account than calls from non-approved contacts. In yet another implementation, calls from approved and/or non-approved sources can be redirected, or forwarded, to other destinations, such as to a device at another phone number or extension.

According to another example implementation, filtered or unfiltered incoming communications can prompt an automatic reply to be sent from the computing device. For example, as shown in FIG. 2, filtered incoming communications can prompt the sending of a text message from the computing device 100. In some implementations, the text message may indicate that the user of the computing device is unavailable or not responding to incoming communications. In another implementation, a text message may indicate when a user of the computing device may become available.

Figure 3:
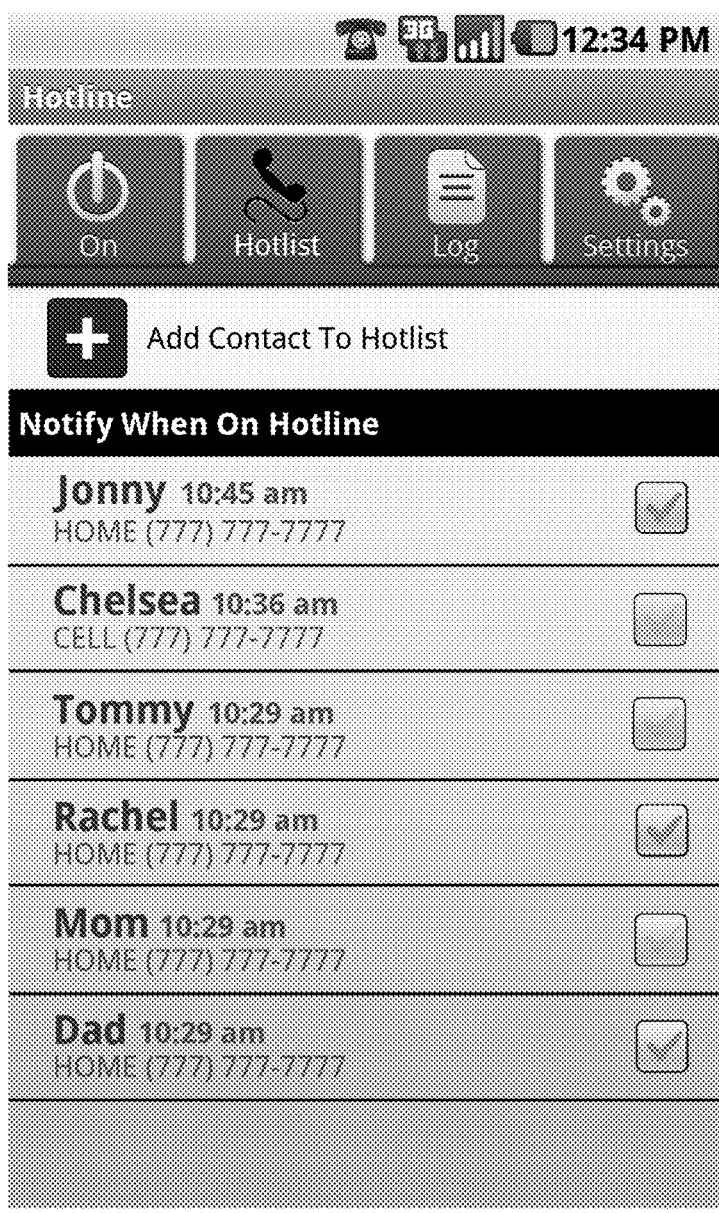
FIG. 3 depicts an illustration of a contact whitelist 300, according to an example implementation.

FIG. 3 depicts an illustration of a contact whitelist 300, according to an example implementation. In some implementations, a list of contacts can be generated from which to permit inbound communications to be allowed or processed in a first manner while selective filtering is activated, i.e. a "whitelist." In one implementation, one or more pre-existing contacts associated with the computing device 100 or a user of the computing device may be added to the whitelist. In another implementation, a contact may be created and added to a whitelist during creation of the whitelist, or while selective filtering is activated. In some implementations, a list of contacts may be imported from a source external to the computing device. For example, a list of contacts associated with a user may be downloaded from the Web. In another implementation, multiple contacts may be formed, added, manipulated, deleted, or processed as a group. For example, incoming communications from a whitelisted group of contacts could be forwarded to a particular destination.

In some implementations, a contact may be associated with one or more identifiers. For example, a single contact could be associated with home number, a work number, a mobile number, etc. Selective filtering may be applied to messages corresponding to just a particular identifier associated with a contact, or applied to messages corresponding to any of the identifiers associated with a contact.

According to some implementations, selective filtering can be applied based on multiple lists of contacts. For example, different lists could be associated with different groups of contacts. Each such list could be associated with a unique action or processing to be applied at the computing device 100 responsive to receiving an incoming communication corresponding to that whitelist. In one implementation, selective filtering could be applied to improve phone tree call direction. For example, rather than require a caller on a phone tree to select an option after listening to recorded choices, the caller could be directed based on the grouping or list associated with the caller's contact identifier. In another implementation, contacts could be added to the groups based on the caller history associated with the contact. These innovations could reduce the need for operators or phone trees with multiple branches and improve customer care scores.

According to another example implementation, a list of contacts can be generated from which to block, or process in a second manner, inbound communications while selective filtering is activated, i.e. a "blacklist." One of skill in the art will recognize the innovations disclosed herein as generally applicable, where appropriate, to selective filtering based on blacklists, as well as whitelists.

Some implementations may filter incoming communications based on other criteria besides, or in addition, to contact identifier. For example, as shown in FIG. 2, incoming communications can be filtered by type, e.g., voice or text.

Figure 4:
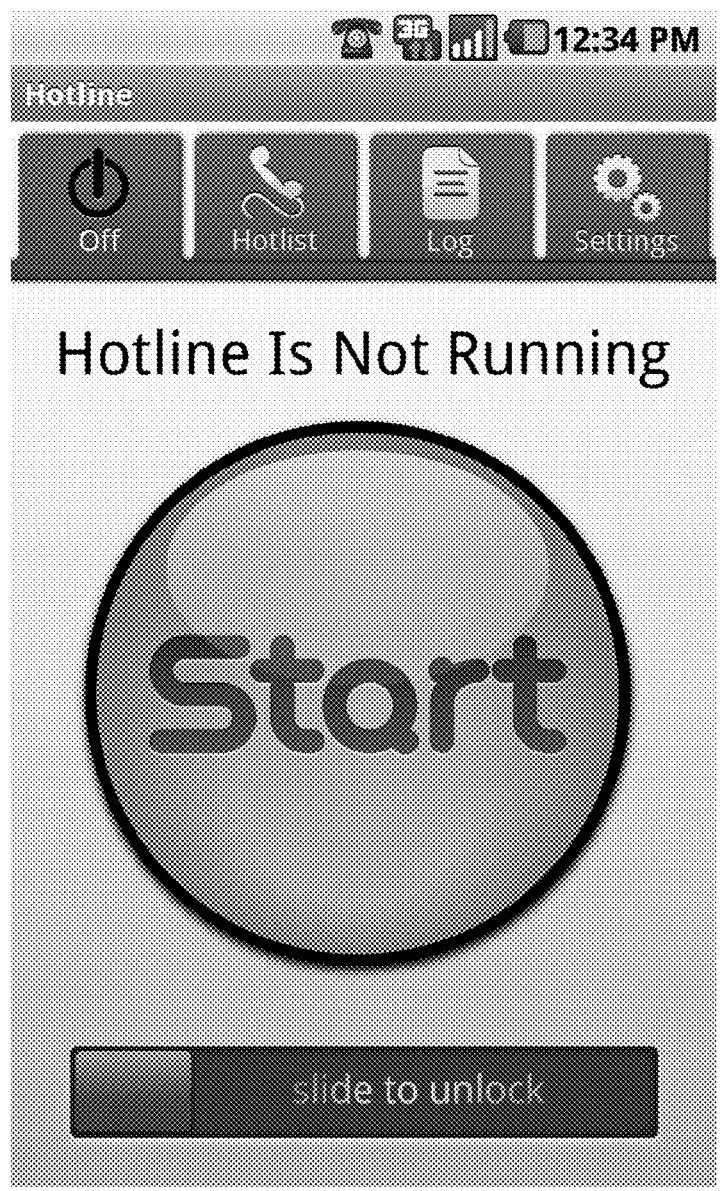
FIG. 4 depicts an illustration of an interface for activating selective filtering 400, according to an example implementation.
Figure 10:
FIG. 10 depicts an illustration of an interface for deactivating selective filtering 1000, according to an example implementation.

FIG. 4 depicts an illustration of an interface for activating selective filtering 400, according to an example implementation. A user of a computing device may not always wish to filter incoming communications. Thus, in some implementations selective filtering can be activated or deactivated by a receiving a user interaction at the computing device 100. For example, as shown in FIGS. 4 and 10, a selective filtering operating mode may be activated or deactivated by a user gesture received at a mobile computing device. According to an example implementation, a second user gesture may be first required to unlock, or enable, the computing device to be switched into a selective filtering operating mode by the first or another user gesture. For example, as shown in FIG. 4, the application user interface must be first unlocked before the "Start" button can be activated. Requiring an additional user gesture may help prevent the inadvertent activation or deactivation of selective filtering. In another implementation, selective filtering at the computing device may be activated remote from the computing device.

According to some implementations, selective filtering may be activated automatically, e.g., without contemporaneous prompt from a user. In some implementations, selective filtering may be activated at a scheduled time, for example, at a time pre-selected by a user. In another example implementation, selective filtering may be activated based on the location of the computing device. For example, a selective filtering of communications based on an emergency contacts list could be activated when a mobile computing device enters range of a movie theatre. In some implementations, an absolute or relative location of the computing device can be detected using GPS, the presence of particular local area networks, or other methods known in the art. Selective filtering may be deactivated according to similar criteria. Also, in another example implementation, selective filtering may be activated for a predetermined amount of time, or deactivated when a prescribed amount of time lapses after being activated.

Figure 5:
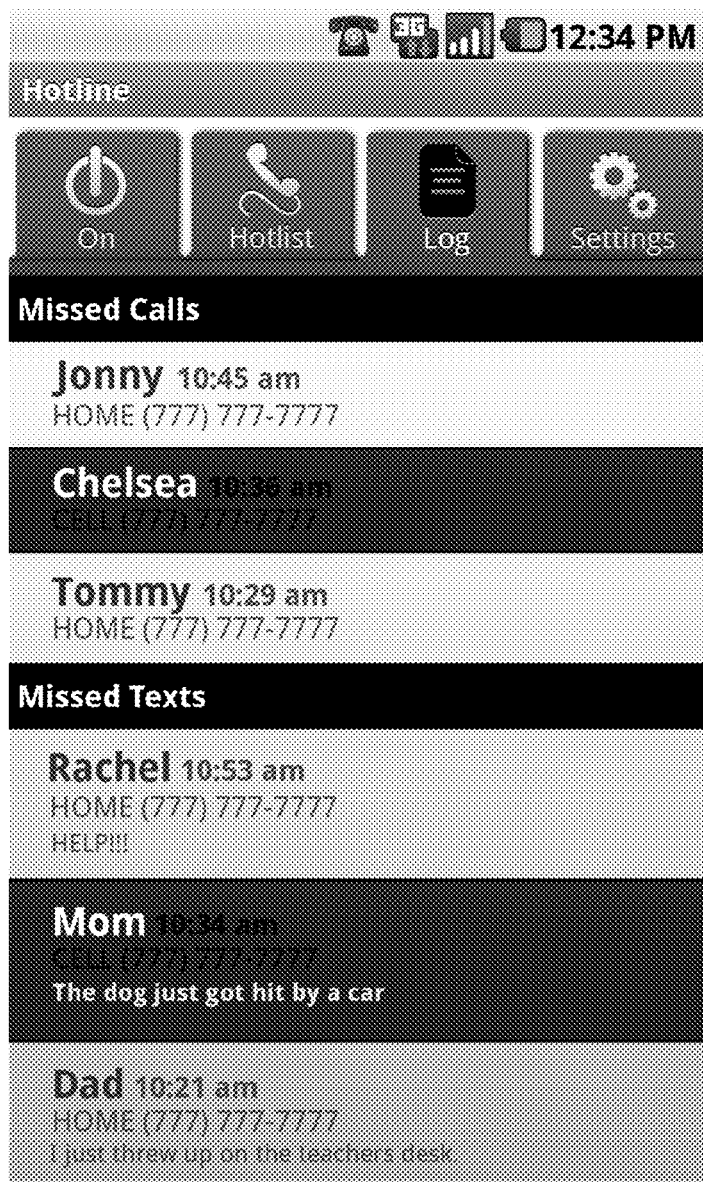
FIGS. 5-6 depict illustrations of a communications log 500, according to an example implementation.
Figure 6:
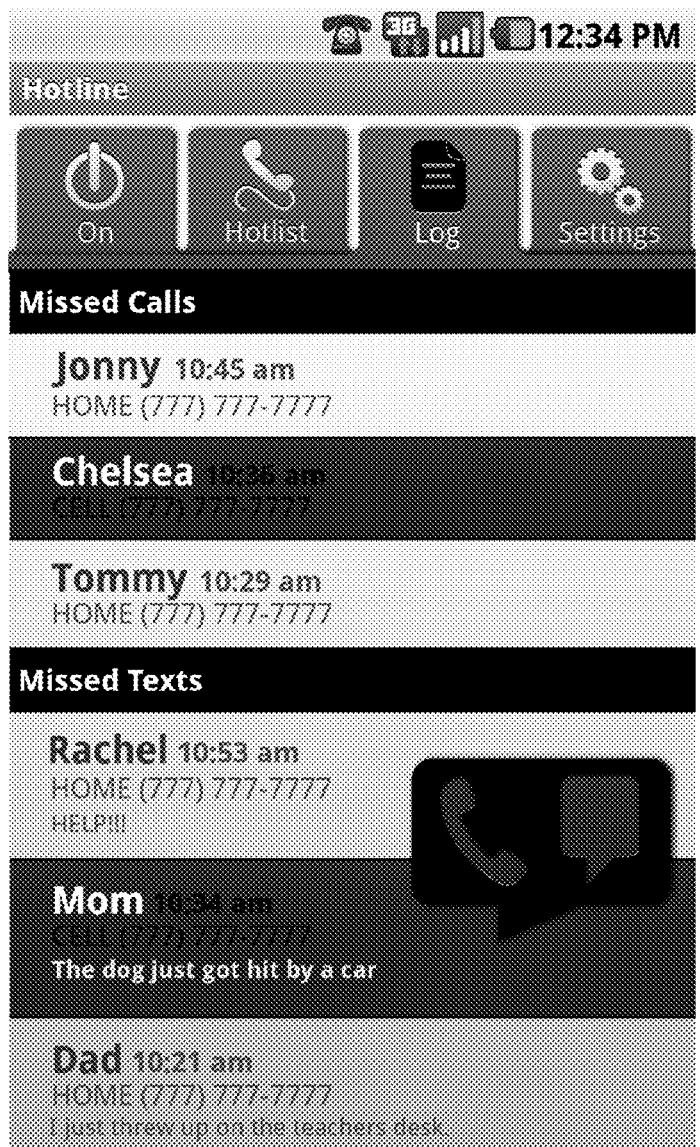

FIGS. 5-6 depict illustrations of a communications log 500, according to an example implementation. In some implementations, a computing device may keep a log of incoming mobile communications. In an example implementation, the communications log may differentiate between communications processed in different manners. For example, as shown in FIG. 5, a representation of the communications log may visibly indicate which communications were allowed and which were filtered. In some implementations, separate logs may be maintained for allowed and filtered communications. In another implementation, a log may represent one group of communications, but not the other.

According to some implementations, a communications log may provide a convenient interface for which to respond to missed communications. For example, as shown in FIG. 6, a missed call may be responded to by voice or text initiated from a visual representation of the communications log file.

Figure 7:
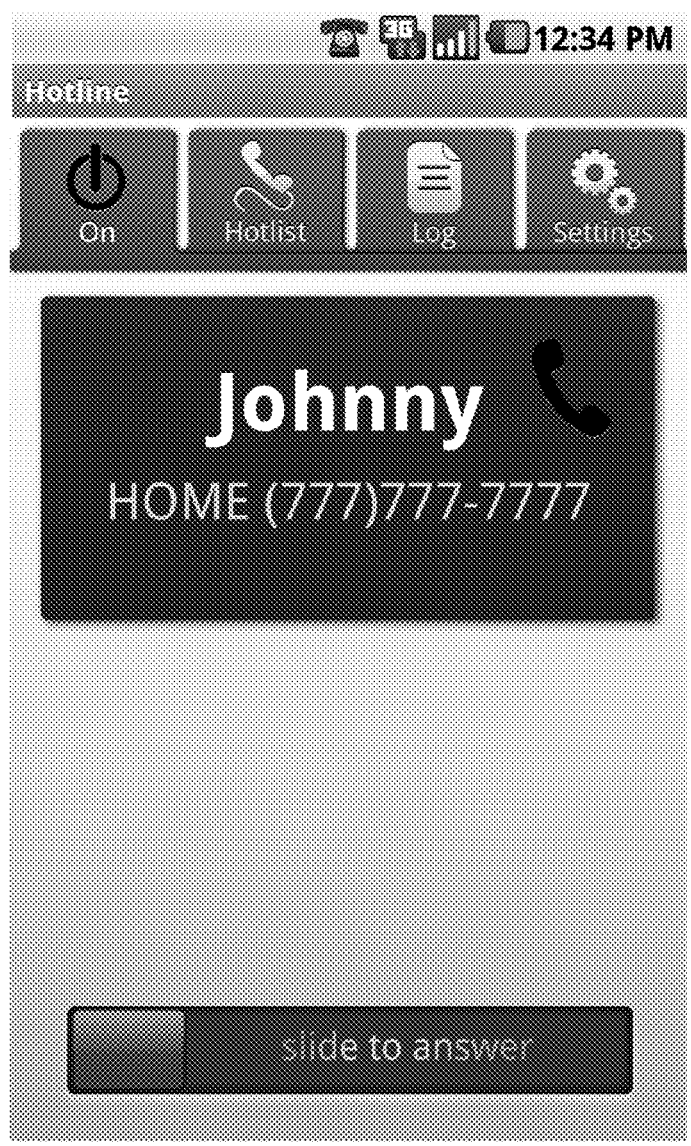
FIG. 7 depicts an illustration of an incoming phone call communication 700, according to an example implementation.
Figure 8:
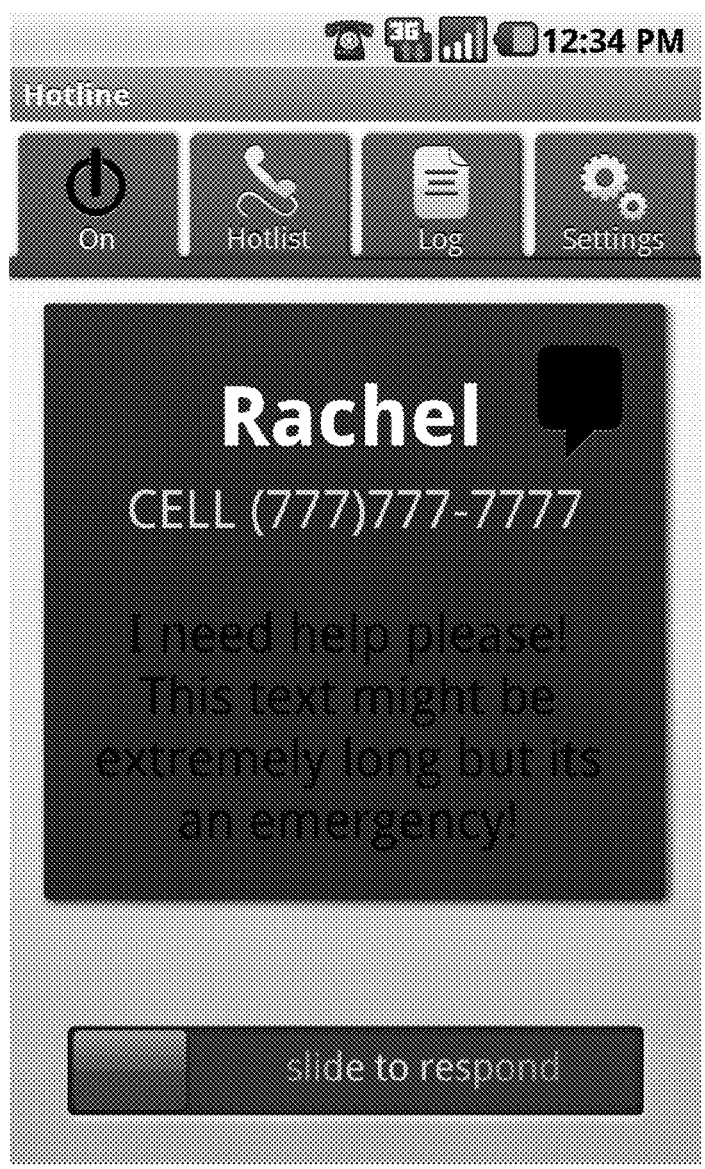
FIG. 8 depicts an illustration of an incoming text message communication 800, according to an example implementation.

FIGS. 7-8 depict illustrations of an incoming communication, according to an example implementation. In some implementations, while a selective filtering operating mode is activated, an application associated with the selective filtering mode may assume responsibility for handling incoming calls, in conjunction with, or in place of a default, or otherwise configured application. Thus, as shown in FIG. 7, the selective filtering application may receive a user gesture to answer an approved phone call. Similarly, as shown in FIG. 8, the selective filtering application may receive and display an incoming text message communication.

Figure 9:
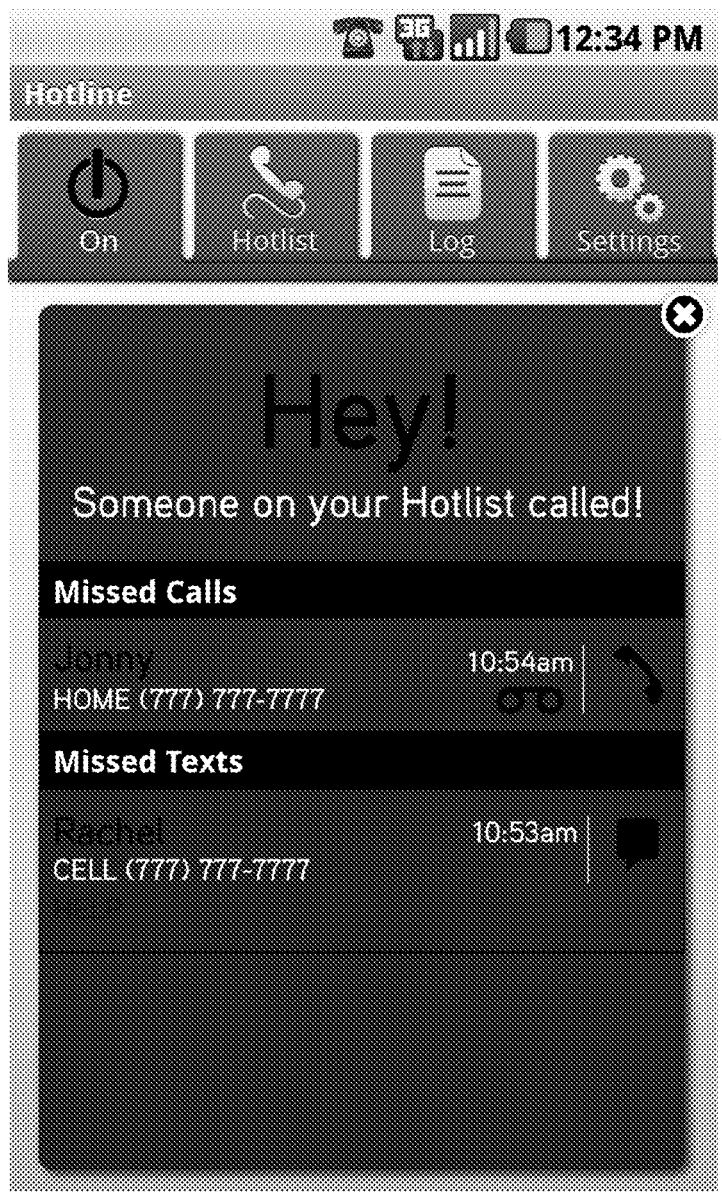
FIG. 9 depicts an illustration of a notification of incoming communications 900, according to an example implementation.

FIG. 9 depicts an illustration of a notification of incoming communications 900, according to an example implementation. In some implementations, as shown in FIG. 9, a user notification can be provided during selective filtering that displays, or otherwise communicates, information about missed or blocked communications.

Figure 11:
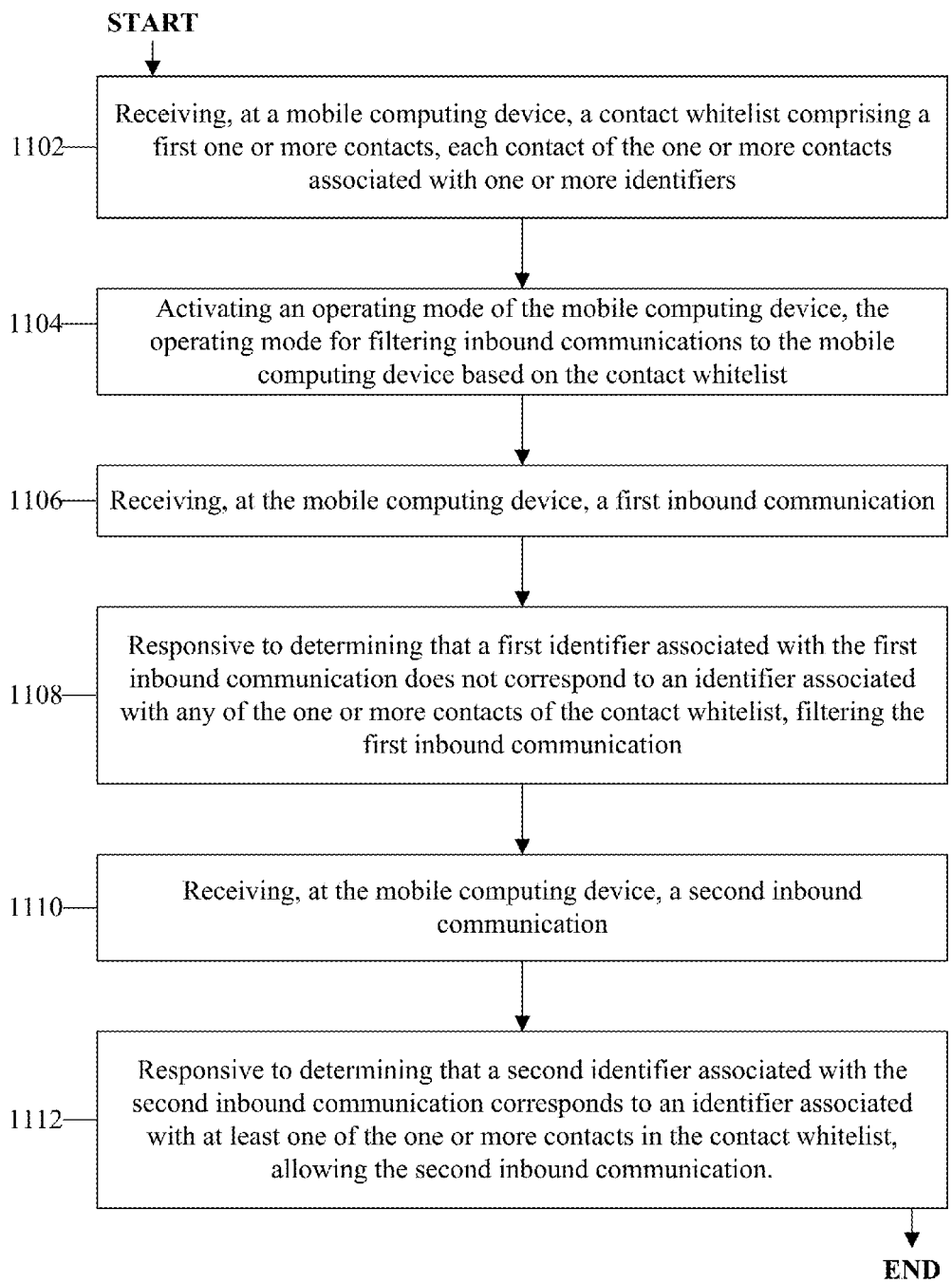
FIG. 11 depicts an illustrative flow diagram of a method 1100, according to an example implementation.

FIG. 11 depicts an illustrative flow diagram of a method 1100, according to an example implementation. As shown in FIG. 11, the method 1100 starts in block 1102, and according to an example implementation includes receiving, at a mobile computing device, a contact whitelist comprising a first one or more contacts, each contact of the one or more contacts associated with one or more identifiers. In block 1104, the method 1100 includes activating an operating mode of the mobile computing device, the operating mode for filtering inbound communications to the mobile computing device based on the contact whitelist. In block 1106, the method 1100 includes receiving, at the mobile computing device, a first inbound communication. In block 1108, the method 1100 includes, responsive to determining that a first identifier associated with the first inbound communication does not correspond to an identifier associated with any of the one or more contacts of the contact whitelist, filtering the first inbound communication. In block 1110, the method 1100 includes receiving, at the mobile computing device, a second inbound communication. In block 1112, the method 1100 includes, responsive to determining that a second identifier associated with the second inbound communication corresponds to an identifier associated with at least one of the one or more contacts in the contact whitelist, allowing the second inbound communication.

It will be understood that the various steps shown in FIG. 11 are illustrative only, and that steps may be removed, other steps may be used, or the order of steps may be modified.

Figure 12:
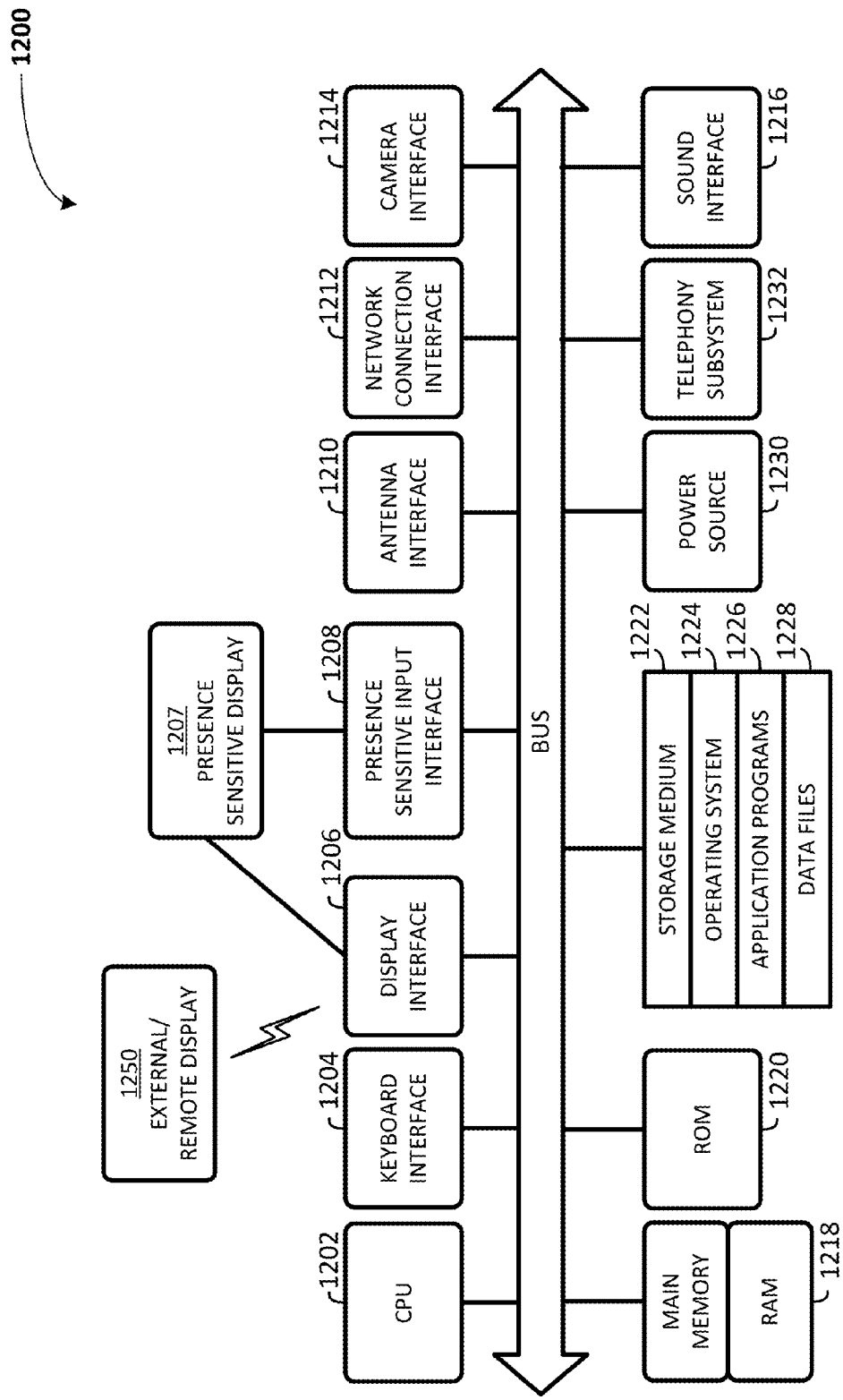
FIG. 12 depicts a block diagram of an illustrative computing device system architecture 1200, according to an example implementation.

FIG. 12 depicts a block diagram of an illustrative computing device system architecture 1200, according to an example implementation. Certain aspects of FIG. 12 may be embodied in a computing device (for example, the mobile computing device 100 as shown in FIG. 1). Various implementations and methods herein may be embodied in non-transitory computer readable media for execution by a processor. It will be understood that the architecture 1200 is provided for example purposes only and does not limit the scope of the various implementations of the communication systems and methods.

The computing device architecture 1200 of FIG. 12 includes a CPU 1202, where computer instructions are processed; a display interface 1206 that acts as a communication interface and provides functions for rendering video, graphics, images, and texts on the display. According to certain some embodiments of the disclosed technology, the display interface 1206 may be directly connected to a local display, such as a touch-screen display associated with a mobile computing device. In another example embodiment, the display interface 1206 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 1206 may wirelessly communicate, for example, via a Wi-Fi channel or other available network connection interface 1212 to the external/remote display.

In an example embodiment, the network connection interface 1212 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 1200 may include a keyboard interface 1204 that provides a communication interface to a keyboard. In one example embodiment, the computing device architecture 1200 may include a presence-sensitive display interface 1207 for connecting to a presence-sensitive display. According to certain some embodiments of the disclosed technology, the presence-sensitive display interface 1207 may provide a communication interface to various devices such as a pointing device, a touch screen, a depth camera, etc. which may or may not be associated with a display.

The computing device architecture 1200 may be configured to use an input device via one or more of input/output interfaces (for example, the keyboard interface 1204, the display interface 1206, the presence sensitive display interface 1207, network connection interface 1212, camera interface 1214, sound interface 1216, etc.) to allow a user to capture information into the computing device architecture 1200. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 1200 or may be a separate device. For example, the input device may be an accelerometer, a magnetometer, a digital camera, a microphone, and an optical sensor.

Example embodiments of the computing device architecture 1200 may include an antenna interface 1210 that provides a communication interface to an antenna; a network connection interface 1212 that provides a communication interface to a network. According to certain embodiments, a camera interface 1214 is provided that acts as a communication interface and provides functions for capturing digital images from a camera. According to certain embodiments, a sound interface 1216 is provided as a communication interface for converting sound into electrical signals using a microphone and for converting electrical signals into sound using a speaker. According to example embodiments, a random access memory (RAM) 1218 is provided, where computer instructions and data may be stored in a volatile memory device for processing by the CPU 1202.

According to an example embodiment, the computing device architecture 1200 includes a read-only memory (ROM) 1220 where invariant low-level system code or data for basic system functions such as basic input and output (I/O), startup, or reception of keystrokes from a keyboard are stored in a non-volatile memory device. According to an example embodiment, the computing device architecture 1200 includes a storage medium 1222 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1224, application programs 1226 (including, for example, a web browser application, a widget or gadget engine, and or other applications, as necessary) and data files 1228 are stored. According to an example embodiment, the computing device architecture 1200 includes a power source 1230 that provides an appropriate alternating current (AC) or direct current (DC) to power components. According to an example embodiment, the computing device architecture 1200 includes a telephony subsystem 1232 that allows the device 1200 to transmit and receive sound over a telephone network. The constituent devices and the CPU 1202 communicate with each other over a bus 1234.

According to an example embodiment, the CPU 1202 has appropriate structure to be a computer processor. In one arrangement, the CPU 1202 may include more than one processing unit. The RAM 1218 interfaces with the computer bus 1234 to provide quick RAM storage to the CPU 1202 during the execution of software programs such as the operating system application programs, and device drivers. More specifically, the CPU 1202 loads computer-executable process steps from the storage medium 1222 or other media into a field of the RAM 1218 in order to execute software programs. Data may be stored in the RAM 1218, where the data may be accessed by the computer CPU 1202 during execution. In one example configuration, the device architecture 1200 includes at least 125 MB of RAM, and 256 MB of flash memory.

The storage medium 1222 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 1222, which may comprise a machine-readable storage medium.

According to one example embodiment, the term computing device, as used herein, may be a CPU, or conceptualized as a CPU (for example, the CPU 1202 of FIG. 12). In this example embodiment, the computing device may be coupled, connected, and/or in communication with one or more peripheral devices, such as display. In another example embodiment, the term computing device, as used herein, may refer to a mobile computing device 200, such as a smartphone or tablet computer. In this example embodiment, the computing device may output content to its local display and/or speaker(s). In another example embodiment, the computing device may output content to an external display device (e.g., over Wi-Fi) such as a TV or an external computing system.

In some embodiments of the disclosed technology, the computing device 200 may include any number of hardware and/or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
receiving, at a mobile computing device, a contact whitelist comprising a first one or more contacts, each contact of the first one or more contacts associated with one or more identifiers;
activating an operating mode of the mobile computing device, the operating mode for filtering inbound communications to the mobile computing device based on the contact whitelist;
receiving, at the mobile computing device, a first inbound communication comprising a first phone call;
responsive to determining that a first identifier associated with the first inbound communication does not correspond to an identifier associated with any of the one or more contacts of the contact whitelist, filtering the first inbound communication including directing the first phone call to a first voicemail account associated with the mobile computing device without providing user notification of the first inbound communication at a time of receipt of the first inbound communication;
receiving, at the mobile computing device, a second inbound communication comprising a second phone call; and
responsive to determining that a second identifier associated with the second inbound communication corresponds to an identifier associated with at least one of the one or more contacts in the contact whitelist, allowing the second inbound communication including directing the second phone call to a second voicemail account associated with the mobile computing device; wherein the first identifier and second identifier are different identifiers associated with a same sender.

2. The method of claim 1, wherein filtering the first inbound communication is further responsive to the determining that the first inbound communication comprises a first predetermined type of communication.

3. The method of claim 1, further comprising unlocking functionality for activating the operating mode, responsive to receiving an indication of a first user gesture at the mobile computing device, the activating of the operating mode responsive to receiving an indication of a second user gesture at the mobile computing device.

4. The method of claim 1, wherein the operating mode is activated automatically at a scheduled time.

5. The method of claim 1, wherein the operating mode is activated automatically responsive to determining the mobile computing device is substantially proximate to a predetermined location.

6. The method of claim 1, wherein the operating mode is scheduled to automatically deactivate after a predetermined amount of time.

7. The method of claim 1, further comprising deactivating one or more user notification functionalities of the mobile computing device responsive to activating the operating mode.

8. The method of claim 1, further comprising automatically sending an outbound communication to a destination corresponding to an identifier associated with the first inbound communication, responsive to the determining that the identifier associated with the first inbound communication does not correspond.

9. A non-transitory computer-readable medium that stores instructions that, when executed by at least one processor, cause the processor to perform a method comprising:
receiving, at a mobile computing device, a contact whitelist comprising a first one or more contacts, each contact associated with one or more identifiers;
activating an operating mode of the mobile computing device, the operating mode for filtering inbound communications to the mobile computing device based on the contact whitelist;
receiving, at the mobile computing device, a first inbound communication;
responsive to determining that a first identifier associated with the first inbound communication does not correspond to an identifier associated with any of the one or more contacts in the contact whitelist, filtering the first inbound communication including directing the first phone call to a first voicemail account associated with the mobile computing device without providing user notification of the first inbound communication at a time of receipt of the first inbound communication;
receiving, at the mobile computing device, a second inbound communication; and
responsive to determining that a second identifier associated with the second inbound communication corresponds to an identifier associated with at least one of the one or more contacts in the contact whitelist, allowing the second inbound communication including directing the second phone call to a second voicemail account associated with the mobile computing device; wherein the first identifier and second identifier are different identifiers associated with a same sender.

10. The non-transitory computer-readable medium of claim 9, wherein the operating mode is deactivated automatically at a scheduled time.

11. The non-transitory computer-readable medium of claim 9, wherein the operating mode is deactivated automatically, responsive to determining the mobile computing device is within a threshold distance of a predetermined location.

12. The non-transitory computer-readable medium of claim 9, wherein the operating mode is scheduled to automatically activate after a predetermined amount of time.

13. The non-transitory computer-readable medium of claim 9, the method further comprising maintaining discrete logs of filtered and allowed inbound communications.

14. The non-transitory computer-readable medium of claim 9, wherein the first inbound communication comprises a text message, and filtering the first inbound communication comprises logging the text message without providing user notification at the time of receipt of the text message.

15. The computer-readable medium of claim 9, the method further comprising activating one or more user notification capabilities of the mobile computing device responsive to deactivating the operating mode.

16. The computer-readable medium of claim 9, the method further comprising automatically forwarding the first inbound communication to a predetermined destination responsive to the determining that an identifier associated with the first inbound communication does not correspond.

* * * * *